United States Patent [19]

Bourrié et al.

[11] 4,071,271
[45] Jan. 31, 1978

[54] AUTOMATIC RELEASE AND EJECTION LOCKING MECHANISM

[75] Inventors: Georges E. Bourrié, Neuilly sur Seine; Robert Marc Lensel, Bourg la Reine, both of France

[73] Assignee: R. Alkan & Cie., Valenton, France

[21] Appl. No.: 708,819

[22] Filed: July 26, 1976

[30] Foreign Application Priority Data

July 29, 1975 France ................................ 75 23624

[51] Int. Cl.² ............................................. E05C 19/16
[52] U.S. Cl. ....................................... 292/201; 292/252
[58] Field of Search ........................ 292/252, 144, 201; 49/31; 85/5 B

[56] References Cited

U.S. PATENT DOCUMENTS

| | | | |
|---|---|---|---|
| 3,214,195 | 10/1965 | Zahuranec et al. | 85/5 B X |
| 3,430,305 | 3/1969 | Geffner | 85/5 B X |
| 3,942,828 | 3/1976 | Bourrié et al. | 292/201 |
| 3,980,327 | 9/1976 | Duran | 292/252 |

Primary Examiner—Richard E. Moore
Attorney, Agent, or Firm—William Anthony Drucker

[57] ABSTRACT

This automatic release and ejection locking mechanism for said equipment boxes, notably for aircraft comprises locking balls releasable from their locked condition by means of a piston constantly urged by a coiled compression spring to its release position. The locking means are held against the force of the ejection spring by means of an effort scalingdown device, so that the force to be applied to said device for keeping the locking action may be very moderate and the release can be obtained by reducing or cancelling the low retaining force exerted on the effort scaling-down device, for example by means of electromagnetic release means, in combination or not with a permanent magnet. (FIG. 1)

7 Claims, 3 Drawing Figures

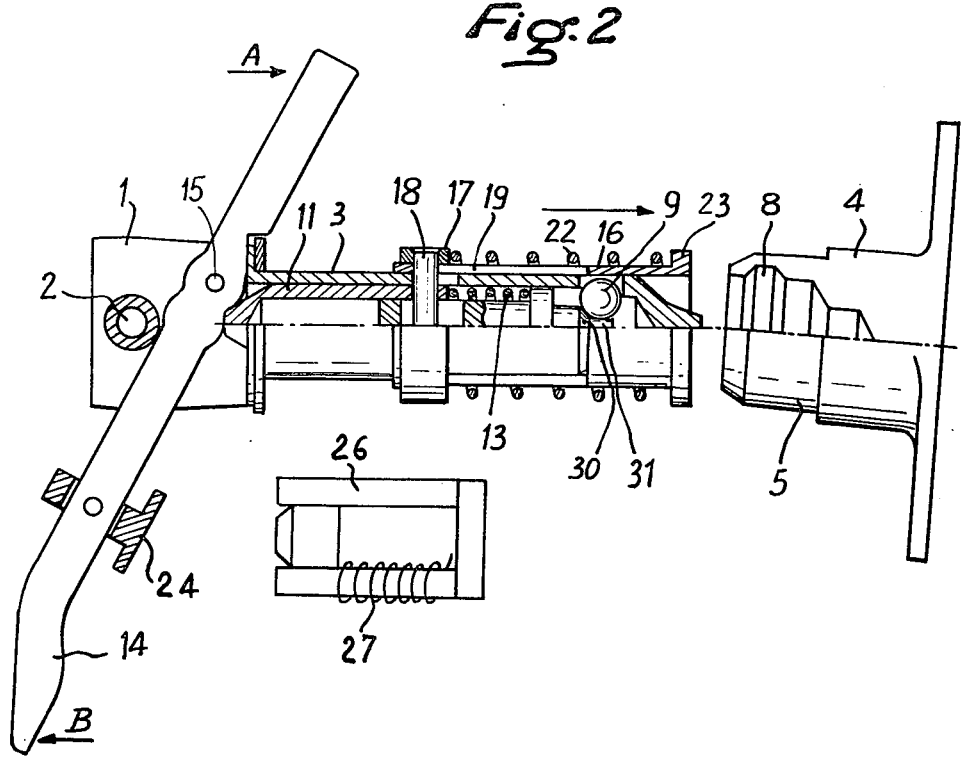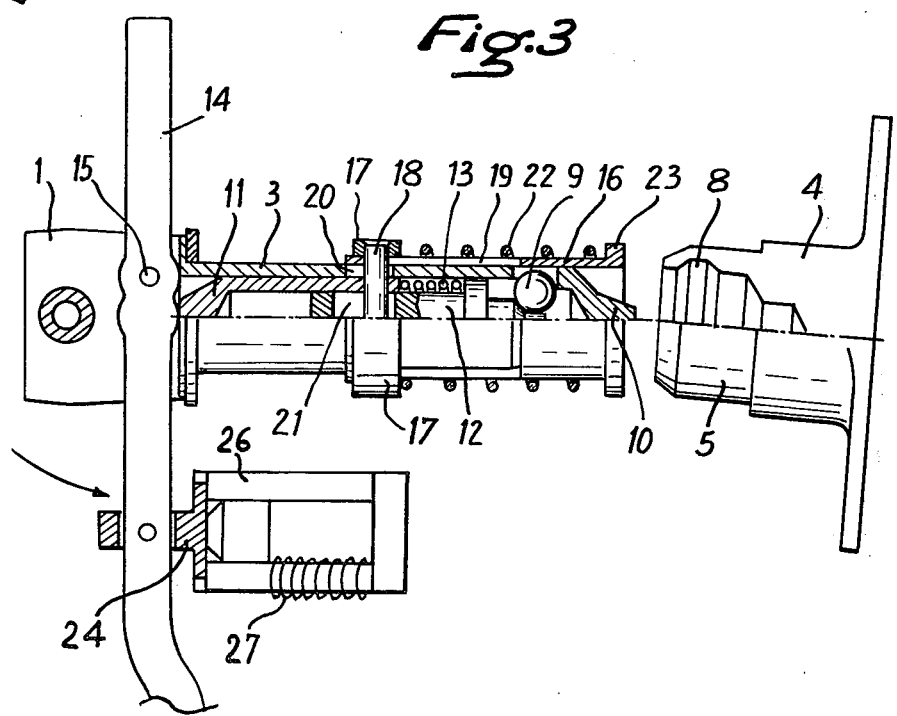

AUTOMATIC RELEASE AND EJECTION LOCKING MECHANISM

BACKGROUND OF THE INVENTION

1. Field of the Invention

This invention relates to an electro-mechanical device incorporating manual emergency control means for the automatic opening of the doors of boxes of the type enclosing safety equipments on aircraft, such as protection masks and oxygen generators.

2. Description of the Prior Art

Devices designed for the same general purpose are already known through other U.S. Patent Nos. 3,753,316 and 3,942,828.

These patents recite devices comprising a ball-type locking mechanism wherein the withdrawal of a piston, caused either by the magnetic pull of a solenoid or manually, permits the movement of a set of balls towards an inoperative position for releasing the door closing members. The power demand, notably for the solenoid, in order to release the piston, increases with the force necessary for moving the balls and with the resultant clamping force exerted on the locking piston proper.

SUMMARY OF THE INVENTION

This invention is likewise concerned with a piston-type device controlling a set of locking balls and adapted to be withdrawn by electromagnetic pull or manual operation, but its essential purpose is to minimise the power consumption necessary for releasing the device, notably the power demand of an electromagnetic control device of which the over-all dimensions and the electric power consumption may thus be reduced considerably.

For obtaining the above-defined result, the longitudinal release movement of the piston is obtained not by the direct action of an electromagnet but by the thrust exerted by a prestressed spring, the release control action consisting simply in releasing the energy stored in the spring.

As the maximum effort exerted on the balls by the movable portion of the system is subordinate to the conditions of operation, the force of the spring which is necessary for withdrawing the piston is so determined that the release takes place irrespective of the amount of effort exerted, within predetermined limits, on the balls by said movable portion.

According to a complementary feature characterising this invention, the spring of which the energy is utilized for retracting the balls is so arranged as that, when said energy is freed by the release action, an extraction and ejection force is exerted on the movable portion of the system, that is, on the opening portion of the equipment box.

In a preferred form of embodiment of this invention the locking condition is maintained against the force of the ejection spring by means of an effort scaling down or reducing device, whereby the force to be exerted on said device for keeping the locking action may be very low and the mechanism can be released by reducing or cancelling the low retaining force exerted on the effort scaling down or reducing device, for example by means of electromagnetic release means, in combination or not with the permanent magnet.

BRIEF DESCRIPTION OF THE DRAWING

FIG. 2 is a similar view of the same device but shown after the release and ejection of the opening portion, and FIG. 3 is a similar view of the same device shown in its release position but reset, the opening portion being ready to be re-closed in a locked condition while storing the energy necessary for a subsequent release.

DESCRIPTION OF THE PREFERRED EMBODIMENT

Figure 1:
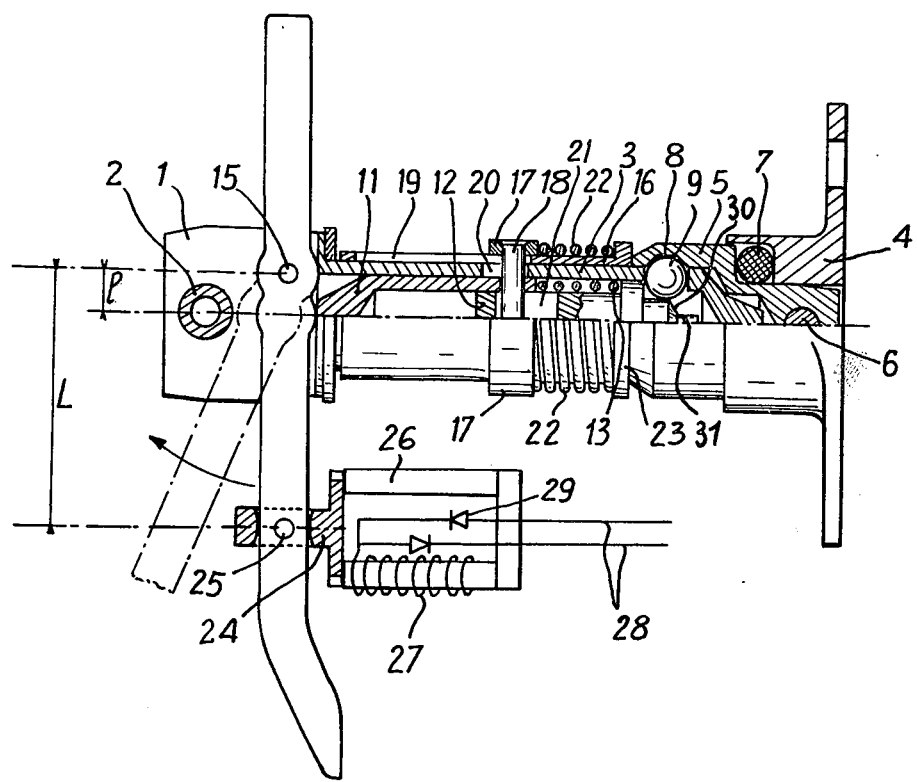
FIG. 1 is a part-elevational, part sectional view (the latter in longitudinal section) of the device of this invention shown in its locked condition.

The automatic release and ejection mechanism according to this invention comprises a lock body 1 secured to the box (not shown) containing the safety equipments or gears through a slightly floating mounting 2. This body 1 has a hollow cylindrical extension 3 disposed between said body 1 and a portion 4 of the opening door, lid or cover (not shown), in which portion 4 the hollow release member 5 is mounted also through the medium of a slightly floating mounting 6, a resilient gasket or packing 7 being interposed between said portion 4 and the hollow member 5 to permit the angular movements of the latter while urging same to its intermediate or mean position when no transverse efforts are exerted thereon. Ths hollow release member 5 comprises a circular inner groove 8 engageable by a set of lock balls 9 housed in radial holes formed in said hollow cylinder 3, the latter terminating at its end opposite the body 1 with a frustoconical portion 10 the tapered outer surface of which facilitates the engagement of the hollow member 5 over the hollow cylinder 3 during the box closing movement.

Slidably mounted in the hollow cylinder 3 are a hollow piston 11 and a solid piston 12 partially engaging the bore of hollow piston 11 but projecting therefrom at its end adjacent the portion 4, a coil compression spring 13 being interposed between the end of piston 11 adjacent said portion 4 and a shoulder of piston 12 so as to constantly urge this piston 12 against the balls 9 and the bottom of the hollow piston 11 against a control lever 14 fulcrumed at 15 on the lock body. To facilitate the understanding of the present disclosure, it will be well to remember from the onset that in the locked position (FIG. 1) the piston 12 urged by spring 13 holds the balls 9 in the inner circular groove 8 of hollow member 5 rigid with the cover lid or door, but in any case a detailed description of the mode of operation of the mechanism will be given presently.

Slidably mounted on, and surrounding, the cylinder 3 is an ejection socket 16 surrounded in turn by a ring 17 rigidly assembled by a radial pin 18 to the piston 11. This pin 18 extends through a slot 19 formed along two diametrally opposed generatrices of the ejection socket 16, the length of these slots 19 permitting the necessary stroke of said socket 16 in relation to the lock body 1, 3. This pin 18 also extends through the hollow cylinder 3 having a slot 20 formed therein and through the piston 12 comprising another slot 21 permitting the relative movement of pistons 11 and 12 as required for the operation of the device.

A coil compression spring 22 stronger than the aforesaid spring 13 engages with one end the heel 23 of socket 16 on the side thereof adjacent the portion 4, and with the other end the edge of said ring 17, whereby the socket 16 is constantly urged to the right as seen in the FIGS., that is, against the hollow member 5, when the latter is in its locking position (FIG. 1), whereas the ring 17 and piston 11 both assembled by said pin 18 with the ring 17 are urged to the left. Thus, piston 11 abuts the lever 14 and urges the latter for rotation about its fulcrum pin 15 in the clockwise direction as shown in FIG. 1. In the locking position this rotation, in the specific form of embodiment illustrated, is prevented by the magnetic engagement between a swivel flange 24 (pivotally mounted to the lever 14 by means of a pin 25) and a known type of a permanent magnet device 26 associated with a solenoid 27, this electromagnetic device being rigid with the fixed portion of the assembly, that is, the equipment-containing box.

The thrust of piston 11 is exerted on lever 14 through a lever arm $l$ (FIG. 1) and the electromagnetic device exerts on said lever 14 a tractive effort through a considerably longer lever arm L, the lever-arm ratio $l/L$ being such that even a very slight force of magnetic adherence of swivel flange 24 is sufficient for counteracting the force of springs 22 and 13 and keeping the lever 14 in the locking position illustrated in FIG. 1.

An electric a/c or d/c supply 28 is provided. If a/c is supplied, using one or more diodes such as 29 will cause the current to flow only in one direction through the solenoid coil 27, this direction being so selected that the magnetic field thus created by the solenoid winding will counteract the permanent magnetic field of magnet 26. Thus, when the electromagnetic device is energized in the conditions already set forth in the above-mentioned prior patents, the field resulting from the combination of the field thus created and the initial permanent field becomes insufficient for retaining the swivel flange 24 and the release of the lever 14 is attended by the release and the ejection of the hollow member 5 rigid with the opening portion, thus leading to the condition illustrated in FIG. 2, as will be explained hereinafter. To complete the description preliminary to the following disclosure, it may be emphasized that in the direction of the movable member 4 the portion of piston 12 that retains the balls 9 radially outwards is followed by a tapered portion 30 of decreasing diameter and then by an end portion 31 of relatively small diameter permitting the radial retraction of said balls 9 as a consequence of the movement of piston 12 to the left in relation to cylinder 3, as seen in FIG. 1.

When the lever 14 has been released from the locking position of FIG. 1, the piston 11 is moved to the left (FIG. 1 or 2) by the preponderant action of spring 22 weakly assisted by spring 13, whereby lever 14 is pushed to the position shown in FIG. 2 and carries along the piston 12 through the diametral pin 18 until the narrow portion 31 of said piston 12 registers with the balls 9 to permit the radial inward movement thereof. Then, spring 22 acting as an extractor ejects via the socket 16 the hollow member 5 which is no longer positively retained by the balls 9, said spring 22 completing if necessary the inward movement of said balls (towards the axis) along the tapered portion 30 by forcing the piston 12 back against the force of spring 13. The stroke of socket 16 is limited by the length of slot 19.

It is obvious that an external action, for example, a manual control action, exerted on said lever 14 in the direction of the arrow A or B (FIG. 2) and sufficient for overcoming the magnetic attraction of the electromagnetic device may cause the release and ejection of the movable unit 4 in case of emergency or simply when required, or in case of failure of the electric current supply.

In FIG. 3, the lever 14 is shown after having been restored manually to its magnetically attracted position in the direction of the arrow, so that the piston 11 was slightly moved back to the right while compressing the spring 13 reacting on piston 12 stopped by the balls 9 trapped within the socket 16. This movement of piston 11 is transmitted to the ring 17 and via spring 22 to socket 16. Then the movable assembly can be engaged and this is facilitated during the approach movement by the permissible slight backlashes about their average position of the lock body 1 and hollow member 5, and also by the tapered portion 10 of the end portion of the lock body 1-3. Finally, the hollow member 5 engaging the socket 16 forces the latter backwards against the action of spring 22 and when the circular groove 8 registers again with the balls 9 these are moved back into said groove 8 by the piston 12 restored to its initial position (FIG. 1) by the spring 13. The locking action is thus obtained as shown in FIG. 1, the spring 22 being restressed to store resilient energy subsequently available for another release.

It will readily occur to those conversant with the art that the specific form of embodiment described hereinabove should not be construed as limiting the scope of the invention since various modifications and changes may be brought thereto without departing from the basic principles of the invention as set forth in the appended claims.

What we claim is:

1. An automatic release and ejection mechanism, suitable particularly for the closure of safety equipment boxes on aircraft, comprising:
    i. a fixed member for securing to a box, said fixed member defining a cylinder space, said fixed member having in its wall a plurality of radial openings,
    ii. a latch member for securing to the closure of the box, said latch member having a recess adapted to receive a portion of said fixed member including said radial openings, said latching member having in its recess a radial groove which, when the latch member is fully engaged on the fixed member, is radially aligned with said plurality of openings,
    iii. a set of balls disposed one in each of said radial openings
    iv. a piston longitudinally slidable in the cylinder space of said fixed member, said piston having at its end adjacent said openings a first portion of a diameter which, when abutted by said balls, permits said balls to lie wholly within said fixed member, said piston having a second portion of a greater diameter which, when abutted by said balls, causes said balls to protrude from said fixed member into the radial groove of the latch member for locking the latch member against withdrawal longitudinally off the fixed member
    v. resilient loading means positioned to act between said latch member and said piston, said loading means being stressed by engagement of the latch member onto the fixed member, the force exerted by the loading means urging the piston in the direction to permit release of the balls from the groove of the latch member
    vi. control means movably mounted on said fixed member and coupled to said piston, said control means having a first locking position of movement in which it prevents longitudinal movement of the piston by said loading means, said control means having a second releasing position of movement in which said piston is freed to be moved longitudinally by said loading means vii. means for retaining said control means releasably in said locking position.

2. An automatic release and ejection mechanism, as claimed in claim 1, comprising an ejector member mounted externally on said fixed member and longitudinally slidable thereon, said resilient loading means acting on said ejector member, said ejector member being positioned for abutment and stressing by said latching member as said latching member is engaged on and moved along said fixed member, said ejector member serving, when said latching member is released, to thrust said latching member off said fixed member.

3. An automatic release and ejection mechanism, as claimed in claim 1, wherein said control means provides a force-reduction such that the force which has to be exerted on it by said retaining means to retain it in the locking position is less than the force exerted on the control means by the loading means.

4. an automatic release and ejection mechanism, as claimed in claim 3, wherein said force reduction is obtained in that the control means includes a lever coupled to said piston and to said retaining means.

5. An automatic release and ejection mechanism, as claimed in claim 4, wherein said lever is formed as a handle for manual release of said lever from said retaining means.

6. An automatic release and ejection mechanism, as claimed in claim 4, wherein said retaining means comprises a magnetic keeper on said lever, a permanent magnet positioned for abutment by said keeper for retaining said keeper magnetically in the locking position of the control lever, and an electromagnet adapted when energised to counteract the permanent magnet and permit release of the keeper.

7. An automatic release and ejection mechanism, as claimed in claim 4, wherein said retaining means comprises an electromagnet positioned for abutment by said keeper so as, when energised, to retain said keeper in the locking position of the control lever.

* * * * *